United States Patent
Wilkerson et al.

(10) Patent No.: US 6,535,961 B2
(45) Date of Patent: *Mar. 18, 2003

(54) SPATIAL FOOTPRINT PREDICTION

(75) Inventors: Christopher B. Wilkerson, Beaverton, OR (US); Sanjeev Kumar, Princeton, NJ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,601

(22) Filed: Nov. 21, 1997

(65) Prior Publication Data

US 2002/0062423 A1 May 23, 2002

(51) Int. Cl.[7] .............................................. G06F 13/00
(52) U.S. Cl. ....................... 711/137; 711/213; 712/207
(58) Field of Search ................................ 711/137, 204, 711/213, 144–146, 221, 133, 134, 159, 217, 218; 712/207, 237, 239–240

(56) References Cited

U.S. PATENT DOCUMENTS 4,774,654 A * 9/1988 Pomerene et al. .......... 711/122
4,980,823 A * 12/1990 Liu ............................ 711/136
5,704,053 A * 12/1997 Santhanam ................. 712/207
5,778,436 A * 7/1998 Kedem et al. .............. 711/137
5,941,980 A * 8/1999 Shang et al. ................ 712/204

OTHER PUBLICATIONS

Przybylski, Steven, "The Performance Impact of Block Sizes and Fetch Strategies", Proceedings of the 17th Annual International Symposium on computer Architecture, Seattle, Washington, May 28–31, 1990, pp. 160–169.

Seznec, Andre, "Decoupled Sectored Caches: Conciliating Low Tag Implementation Cost and Low Miss Ratio", Proceedings of the 21st Annual International Symposium on Computer Architecture, Chicago, Illinois, Apr. 18–21, 1994, pp. 384–393.

Tyson, Gary et al., "A Modified Approach to Data Cache Management", IEEE Proceedings of MICRO–28, 1995, pp. 93–103.

* cited by examiner

Primary Examiner—Matthew Kim
Assistant Examiner—Denise Tran
(74) Attorney, Agent, or Firm—Alan K. Aldous (57) ABSTRACT

A spatial footprint predictor includes a mechanism to measure spatial footprints of nominating cache-lines and hold the footprints. In some embodiments, the mechanism includes an active macro-block table (AMBT) to measure the spatial footprints and a spatial footprint table (SFT) to hold the spatial footprints. In other embodiments, the mechanism includes a macro-block table (MBT) in which macro-blocks may be active or inactive.

23 Claims, 6 Drawing Sheets

|  | MBTAG | CACHE-LINE NO. | BIT VECTOR | | | |
|---|---|---|---|---|---|---|
|  |  |  | CL-0 | CL-1 | CL-2 | CL-3 |
| ENTRY 0 | 10000H | 2 | 1 | 0 | 1 | 0 |
| ENTRY 1 |  |  |  |  |  |  |
| ENTRY 2 |  |  |  |  |  |  |
|  |  |  |  |  |  |  |
| ENTRY N -1 |  |  |  |  |  |  |

↑ 40   ↑ AMBT

FIG. 3

|  | CACHE-LINE TAG | BIT VECTOR | | | |
|---|---|---|---|---|---|
|  |  | CL-0 | CL-1 | CL-2 | CL-3 |
| ENTRY 0 | 40002H | 1 | 0 | 1 | 0 |
| ENTRY 1 |  |  |  |  |  |
| ENTRY 2 |  |  |  |  |  |
|  |  |  |  |  |  |
| ENTRY X -1 | 40003H | 0 | 0 | 1 | 1 |

↑ 42   ↑ SFT

|  | ACT/ INACT | MBTAG | CACHE-LINE NO. | BIT VECTOR ||||
|---|---|---|---|---|---|---|---|
|  |  |  |  | CL-0 | CL-1 | CL-2 | CL-3 |
| ENTRY 0 |  | 10000H | 2 | 1 | 0 | 1 | 0 |
| ENTRY 1 |  |  |  |  |  |  |  |
| ENTRY 2 |  |  |  |  |  |  |  |
| ENTRY N-1 |  |  |  |  |  |  |  |

86   MBT

FIG. 8

| INSTR ADD AND CACHE LINE NO. | BIT VECTOR | | | |
|---|---|---|---|---|
| | CL-0 | CL-1 | CL-2 | CL-3 |
| ENTRY 0 | | | | |
| ENTRY 1 | | | | |
| ENTRY 2 | | | | |
| | | | | |
| ENTRY Y -1 | | | | |

↑ 90  ↑ SFT

FIG. 9

| INSTR ADD AND DATA ADD | BIT VECTOR | | | |
|---|---|---|---|---|
| | CL-0 | CL-1 | CL-2 | CL-3 |
| ENTRY 0 | | | | |
| ENTRY 1 | | | | |
| ENTRY 2 | | | | |
| | | | | |
| ENTRY Z -1 | | | | |

↑ 94  ↑ SFT

FIG. 10

SPATIAL FOOTPRINT PREDICTION

BACKGROUND OF THE INVENTION

1. Technical Field of the Invention

The present invention relates to computers and, more particularly, to spatial footprint prediction of usage of cache-lines from main memory by a computer.

2. Background Art

Caches hold a relatively small amount of data that can be accessed relatively quickly by a processor. By contrast, main memory holds a relatively large amount of data that is accessed relatively slowly by a processor. Caches are organized into cache-lines. Typically, the smallest replaceable unit in a cache is a cache-line. In many computer systems, a cache-line has 32 or 64 bytes. There are at least two advantages to having large cache-lines. First, a tag is used to identify each cache-line. Therefore, the larger the cache-line, the fewer the number of tags and associated resources that are used for a given amount of data stored in the cache. Second, there is substantial latency in fetching data from main memory. Therefore, it is desirable to reduce the number of fetches from memory. In most applications, there is spatial locality with respect to memory references used. That is, if a program uses data from a reference to address X, there is a fair likelihood that in the near future the program will also use data from a reference to adjacent addresses X+1 and/or X−1. Therefore, by fetching large cache-lines, there is a likelihood that fewer caches lines will need to be access from main memory.

In general larger cache-lines improve performance when spatial locality is available, but may hurt performance by prefetching unnecessary data when there is no spatial locality. For example, a piece of data requested by the processor may have only four bytes. If there is no spatial locality, there may be 28 wasted bytes, in the case of a 32-byte cache-line. Further, accessing the four bytes may have caused eviction of other bytes from the evicted line that would have been used resulting in another access from main memory. Because spatial locality may differ between different applications as well as between different sequences of memory references within a single application, cache designers generally choose a line size with the best average performance across a broad range of reference patterns. This approach wastes bandwidth when a sequence of memory references does not exhibit spatial locality. Further, the cache is polluted by cache-lines that are not needed because the cache-lines can be written over data that would be used.

The present invention is directed to overcoming or reducing the effect of one or more the above-recited problems with access to main memory.

SUMMARY OF THE INVENTION

A spatial footprint predictor includes a mechanism to measure spatial footprints of nominating cache-lines and hold the footprints. In some embodiments, the mechanism includes an active macro-block table (AMBT) to measure the spatial footprints and a spatial footprint table (SFT) to hold the spatial footprints. In other embodiments, the mechanism includes a macro-block table (MBT) in which macro-blocks may be active or inactive.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

Figure 1:
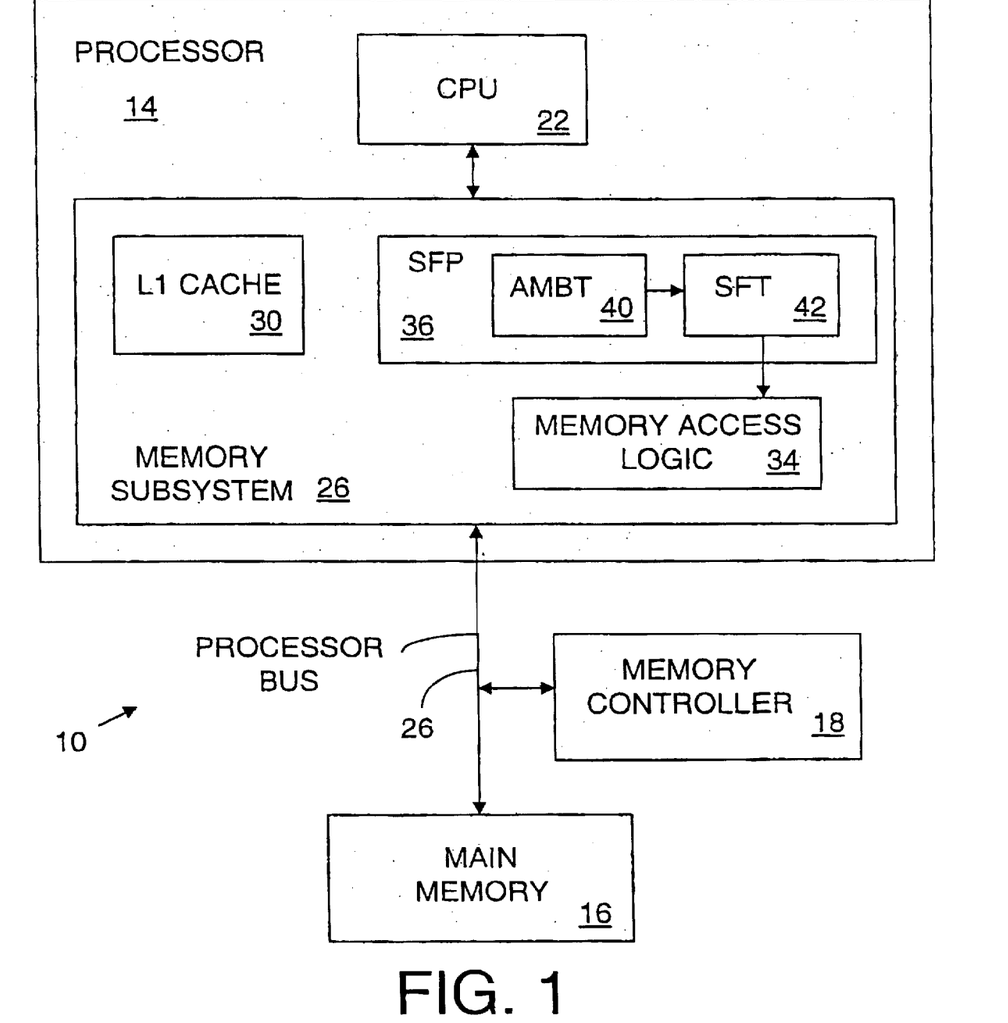
FIG. 1 is block diagram representation of a computer system that includes a spatial footprint predictor according to some embodiments of the invention.

Referring to FIG. 1, a computer system 10 includes a processor 14 that makes memory accesses from and writes to a main memory 16 through a memory controller 18. (The invention is not limited to a particular arrangement of memory controller, such as a look aside or look through arrangement.) Processor 14 includes a central processing unit (CPU) 22 and a memory subsystem 26. Memory subsystem includes an L1 data cache 30, memory access logic 34, and spatial footprint predictor (SFP) 36. SFP 36 includes active macro-block table (AMBT) 40 and spatial footprint table (SFT) 42.

SFP 36 dynamically predicts the spatial locality of a sequence of memory references. Memory access logic 34 may use the predicted spatial locality information in determining which cache-lines to prefetch. With reference to FIG. 1, the invention is described in connection with an SFP that is integrated with L1 cache. However, an SFP also can be integrated with both instruction and unified caches at any level in the hierarchy (e.g., L0, L1, L2). In such a case, data could include instructions.

Figure 2:
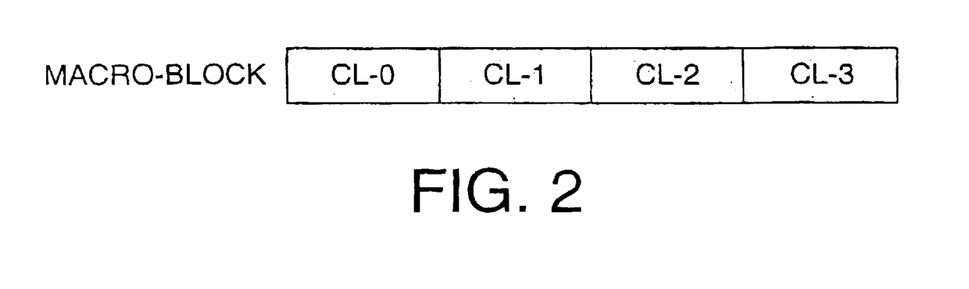
FIG. 2 is a graphical representation of an example of a macro-block.

SFP 36 conceptually groups cache-lines into aligned sequences of adjacent lines called macro-blocks. Merely as an example, FIG. 2 illustrates a macro-block having four cache-lines (CL-0, CL-1, CL-2, and CL-3), each having 64 bytes. (A macro-block could have more or less than four cache-lines. Further, the invention is not restricted to cache-lines that have any particular number of bits). Macro-blocks may be inactive or active. All macro-blocks are initially inactive. A memory reference to an inactive macro-block is referred to as a nominating reference. The cache-line containing the nominating reference is called a nominating cache-line.

Figure 3:
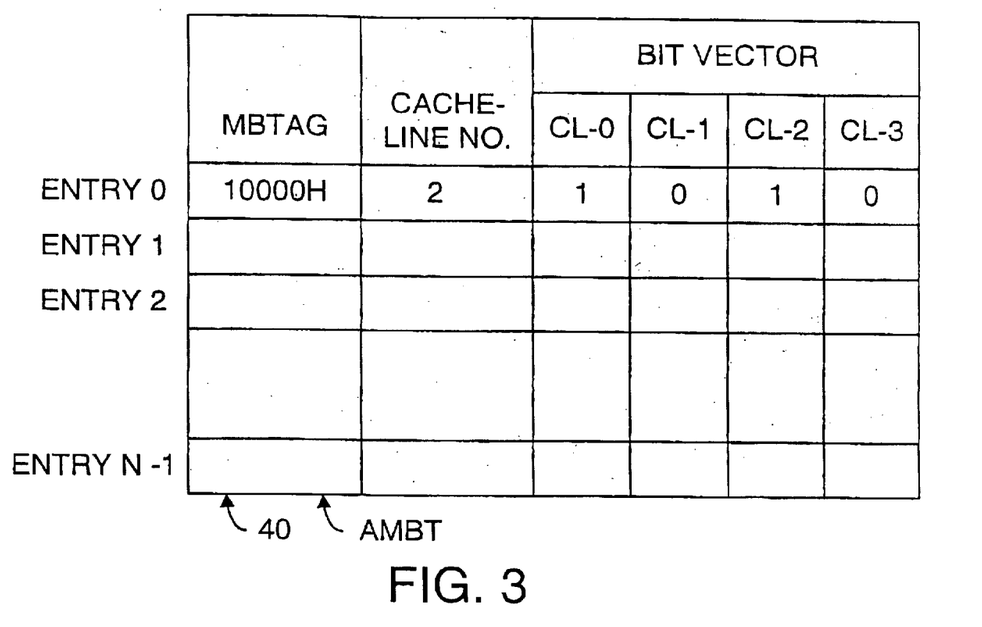
FIG. 3 is a graphical representation of certain details of one embodiment of the active macro-block table (AMBT) of FIG. 1.

Referring to FIG. 3, in some embodiments of the invention, AMBT 40 includes N entries each potentially having information related to columns for a macro-block tag (MBTAG), a cache-line number of the nominating cache-line, and a four-bit bit vector. AMBT 40 may also include other implementation specific columns. Merely as an example, in the case of system with 32-bit addresses, the MBTAG may include bits 8–31 of the addresses of the cache-lines of the macro-block. Two bits in the cache-line number column specify which of the four cache-lines are the nominating cache-line. If there are more than four cache-lines, then more than two bits would be used. The two bits can be bits 6–7 of the address of the nominating cache-line. (The remaining bits 0–5 of the nominating cache-line identify the 64 bytes within the nominating cache-line. In the illustrated embodiments, these bits are not used in AMBT 40 or SFT 42.) AMBT 40 may be used in connection with set associativity in which case the number of bits used in the MBTAG column could be reduced. In that case, an AMBT index could be added to the bits later to restore a cache-line address.

The bit vector represents the spatial footprint of the macro-block associated with that nominating cache-line. Each bit in the bit vector corresponds to a cache-line contained within the macro-block. Cache-lines within a macro-block that are referenced while the nominating cache-line is active make up the spatial footprint of the macro-block's nominating cache-line.

For example, referring to FIG. 3, in entry 0, cache-line CL-2 is the nominating cache-line. Accordingly, a hexadecimal (H) 2 or bits "10" are placed in the cache-line no. column and bit CL-2 of the bit vector is set to a first voltage (e.g., to a logic high voltage). During the time the macro-block with the MBTAG 10000H is active, cache-line CL-0 is also stored in L1 cache 30. Accordingly, bit CL-0 in the bit vector for entry 0 is set to the first voltage. Assuming that cache-lines CL-1 and CL-3 are not referenced (i.e., stored in L1 cache 30) while the macro-block is active, then the spatial footprint for that macro-block with respect to nominating cache-line CL-2 includes the $1^{st}$ and $3^{rd}$ cache-lines and may, for example, be represented as "1010". In this example, 1 signifies a used cache-line, and 0 an unused one.

Assuming there are four cache-lines of 64-bytes each, the macro-block of entry 0 in FIG. 3 begins at address 1000000H and ends at address 10000ffH. Note that if 32-bit addressing is used in the example, MSBs that are 0 are not shown. The invention is not limited to an physical or virtual addressing scheme.

In some embodiments of the invention, L1 cache 30 also has N entries and as long as the nominating cache-line remains in L1 cache 30, the corresponding macro-block remains active in AMBT 40. When the nominating cache-line is evicted from L1 cache 30, the macro-block becomes inactive and is evicted. Another macro-block may be written over the macro-block that was evicted from AMBT 40. The new macro-block may be the same as the macro-block that went inactive, if the cache-line written into L1 cache 30 to replace the evicted cache-line is one of the cache-lines of the macro-block that went inactive and was evicted from AMBT 40.

An evicted macro-block is an inactive macro-block. But an inactive-macro block is not necessarily evicted. A macro-block may become inactive due to, for example, the nominating cache-line being evicted in L1 cache 30. A macro-block could become inactive because another macro-block needs a space in AMBT 40, even if the nominating cache-line remains in L1 cache 30.

Figure 4:
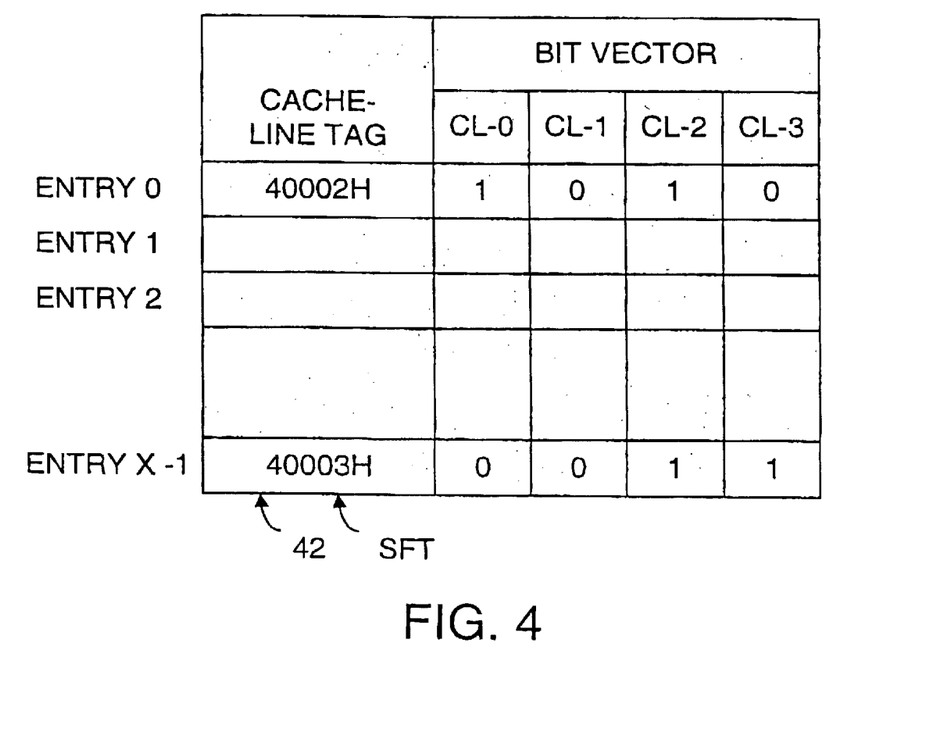
FIG. 4 is a graphical representation of certain details of one embodiment of the spatial footprint table (SFT) of FIG. 1.

L1 cache 30, AMBT 40, and SFT 42 may operate as circular queues with heads and tails according to a well known structure. AMBT 40 may be organized much like a cache for active macro-blocks, and many of the tradeoffs that apply to traditional cache design may also apply to AMBT as well. In alternative embodiments of the invention, the number of entries (N) of AMBT 40 does not equal the number of entries of L1 cache 30. AMBT entries may be evicted when a new AMBT nomination occurs and there are no free AMBT entries. As an example, a least recently used (LRU) algorithm could be used in determining which, if any, AMBT entry to evict from AMBT 40.

Figure 5:
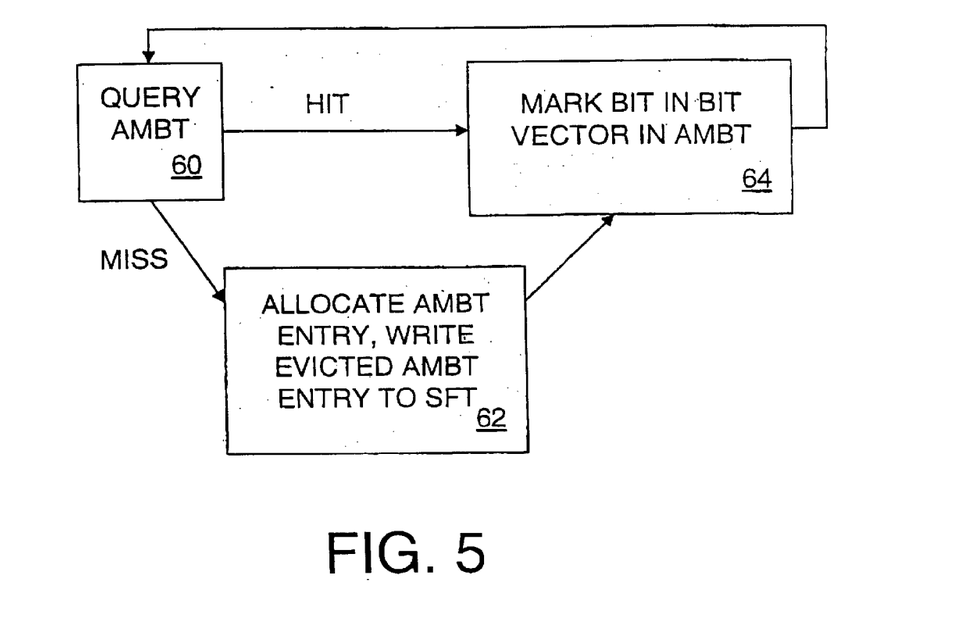
FIG. 5 is a flow diagram illustrating certain operations of the AMBT of FIG. 1.

Referring to FIG. 5, a simplified example is provided of certain operations associated with maintaining AMBT 40. References to L1 cache 30 result in an update to AMBT 40. (A query cache block could have been included within FIG. 5, but was not included to avoid a suggestion as to a required order.) When a cache-line is stored or is to be stored in L1 cache 30, it is determined whether the cache-line is within a macro-block in AMBT 40 (as represented by block 60). When the corresponding macro-block is not in AMBT 40 (a miss), a new macro-block is allocated (as represented by block 62). An evicted macro-block, if any, is written to SFT 42. When the corresponding macro-block is active in AMBT 40 (a hit), the appropriate bit in the bit vector is marked in AMBT 40 (as represented by block 64). If a bit is already marked, it may or may not be marked again. As long as the newly allocated macro-block stays in AMBT 40, references to cache-lines within the macro-block will cause the bit vector entry corresponding to the referenced cache-line to be set. When a macro-block is evicted from the AMBT, the corresponding bit vector is reset.

Under an alternative AMBT, the frequency of requests for a cache-line could be kept track of (e.g., in each bit vector column) and considered by memory access logic 34 in determining which cache-lines to prefetch or a priority of prefetch. Under some embodiments, a cache line must have been fetched twice to be considered part of spatial footprint.

AMBT 40 is a mechanism to measure the spatial footprint of a nominating cache-line. SFT 42 is a history table of the spatial footprint measured by AMBT 40 and is a predictor of future spatial locality with respect to the nominating cache-line. SFP 36 uses SFT 42 to associate a nominating cache-line with its last spatial footprint. SFT 42 may be indexed by the line address of the nominating cache-line. Since a single macro-block may have different nominating cache-lines at different times, SFT 42 may contain multiple entries corresponding to a single macro-block. The number of a nominating cache-line may be represented implicitly in its location (index) in SFT 42.

Referring to FIG. 4, in some embodiments, SFT 42 includes X entries, each to receive information related to a cache-line TAG and a bit vector. SFT 42 may also include other implementation specific columns. X may equal to or be different from N (e.g., X=2N or X=3N). The cache-line TAG, which is used as an index to SFT 42, may be the nominating cache-line address. When a macro-block is evicted from AMBT 40, the nominating cache-line address may be recreated by concatenating the macro-block tag, the AMBT index (if there is one), and the nominating cache-line number. The bit vector in SFT 42 is the spatial footprint for that nominating cache-line. Different cache-lines in a macro-block may have different spatial footprints. The spatial footprint may be different because different cache-lines as fetched following different nominating cache-lines. However, two nominating cache-lines may have different spatial footprints. SFT 42 may simultaneously hold the same macro-block in more than one entry, however, the macro-block entries would be based on different nominating cache-lines. For example, entry X–1 of SFT 40 includes cache-line from macro-block 10000H. A cache-line with a tag 40003H has bit vector 0011. Note that the bit vector could have been the same as for the cache-line in entry 0.

In the illustrated case of FIGS. 3 and 4, AMBT 40 and SFT 42 are fully set associative. If they were less than fully set associative, the cache-line tag of SFT 42 would be less than the full address of the cache-line for the entry.

Entries may be evicted from SFT 42 when a macro-block entry is evicted from AMBT 40 and there are no free entries in SFT 42. Merely as an example, an LRU algorithm could be used to determine which entry is evicted from SFT 42. In some embodiments, a macro-block based on a particular nominating cache-line could be in both AMBT 40 and SFT 42. For example, a later in time macro-block could be in AMBT 40. When the later in time macro-block is evicted from AMBT 40, the resulting bit vector from AMBT 40 could be written over the bit vector of the earlier in time macro-block in SFT 42. As illustrated, entry 0 of AMBT 40 of FIG. 3 occurs earlier in time than entry 0 of SFT 42 in FIG. 4.

Memory access logic 34 may use the spatial footprint in determining which cache-lines to prefetch. Memory access logic 34 may consider various factors in determining which cache-lines to prefetch. The spatial footprint from SFT 42 is not necessarily controlling.

Figure 6:
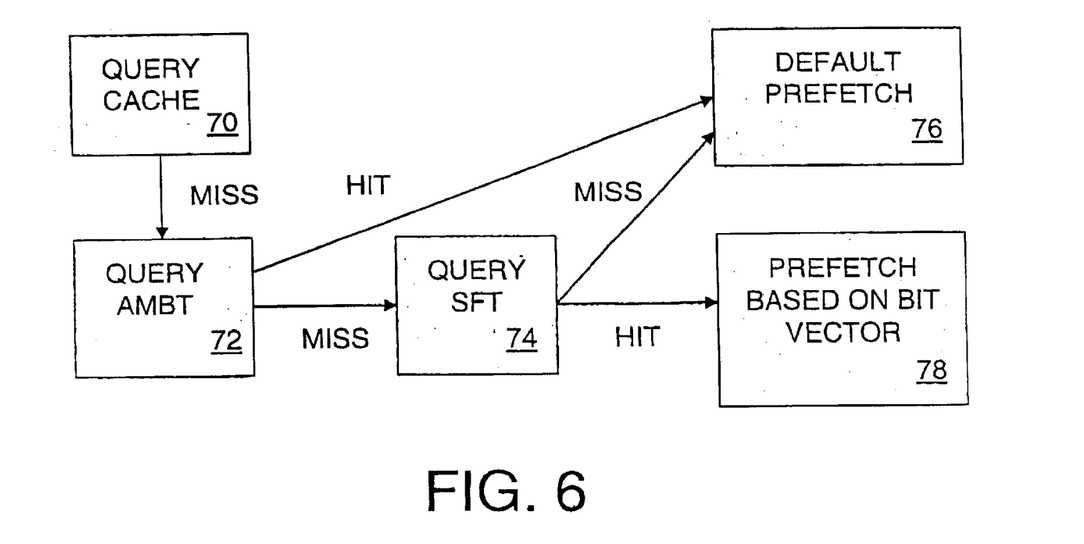
FIG. 6 is a flow diagram illustrating certain operations of the AMBT, SFT, and memory access logic of FIG. 1.

Referring to FIG. 6, a simplified example is provided of certain operations associated with some embodiments of AMBT 40, SFT 42, and memory access logic 34. FIG. 6 does not illustrate all operations of AMBT 40, SFT 42, and memory access logic 34. L1 cache is queried to determine whether a cache-line is included (represented by block 70). If it is not (a miss), the cache-line may be written into L1 cache 30 and AMBT 40 is queried (represented by block 72). If the cache-line is associated within a macro-block in AMBT 40 (a hit), memory access logic 36 may provide its default prefetch (represented by block 76). If the cache-line is not within a macro-block active in AMBT 40 (a miss), the macro-block that the cache-line is within is activated in AMBT 40. SFT 42 is queried (represented by block 74). If the cache-line is within SFT 42 (a hit), memory access logic 34 may perform prefetch based on the bit vector of the cache-line (represented by block 78). If the cache-line is not within SFT 42 (a miss), memory access logic 36 may provide its default prefetch (represented by block 76). The default prefetch may differ depending on whether it is accessed from block 72 or block 74.

In some embodiments, all AMBT 40 hits result in a default prefetch being used (which default prefetch may differ from the default prefetch of block 76). This to prevent pollution caused by performing multiple prefetches based on different nominating lines within the same macro-block. In some embodiments, when the requested cache-line is not resident in SFT 42 (either because it never was there or it has been evicted), there is no information about the previous spatial footprint. In the absence of a better option, a default mechanism is used. Spatial footprints could be stored in larger memory, for example, off-chip. However, this may create latency problems. Moreover, the value of the spatial footprint may decline with time, making a relatively small SFT more valuable for purposes of prediction. Various consideration could be made in deciding which spatial footprints to evict and which to save (either in the SFT or another memory). For example, spatial footprints related to a function could be stored off the SFT while the program is not in the function. When the function is called, the spatial footprints related to the function could be restored to SFT 40.

Under some embodiments, a macro-block may be in only one entry of AMBT 40 at a time. For example, the first cache-line of the macro-block to be in L1 cache 30 would be the nominating cache-line causing the macro-block to be active in AMBT 40. As long as the macro-block remains active, no other cache-line within the macro-block would be a nominating cache-line. If another of the cache-lines within the macro-block were stored in L1 cache 30 or otherwise accessed from memory for use by CPU 22, a bit would be set in the corresponding location in the bit vector, but another macro-block entry would not be made within AMBT 40. The other cache-lines within the macro-block could not be nominating cache-lines until after the macro-block becomes inactive.

For example, assume that none of the cache-lines of a macro-block X are in L1 cache 30. Therefore, macro-block X would be inactive. Then cache-line CL-1 is stored in L1 cache 30, followed by cache-line CL-2 being stored in L1 cache 30. Cache-line CL1 would become the nominating cache-line causing macro-block X to be active. A tag for macro-block X is placed in the MBTAG column of AMBT 40 and bits "01" are placed in the Cache-Line No. column of AMBT 40. A bit would be set in the CL-1 column of the bit vector for macro-block X. A bit also would be set in the CL-2 column of the bit vector for macro-block X, but cache-line CL-2 would not be a nominating cache-line. Once the macro-block becomes inactive, any of the cache-lines (including CL-2) within the macro-block could be the nominating cache-line causing the macro-block to become active. However, in the case where a macro-block could be evicted from AMBT 40 before all the cache-lines of the macro-block are evicted from L1 cache 30, an algorithm would be used to determine the nominating cache-line. One algorithm would be to have the cache-line that had been in L1 cache 30 the longest be the nominating cache-line. Another algorithm would be to have the cache-line that is the first to be stored in L1 cache 30 after the macro-block becomes inactive be the nominating cache-line to reactivate the macro-block. Yet another algorithm could involve having a cache-line in L1 cache 30 that was not previously the nominating cache-line be the nominating cache-line.

Note that the bit vector of a cache-line may change with time. Therefore, SFT 42 is a recent history table.

Under other embodiments, a macro-block may be in more than one entry of AMBT 40 at a time. For example, each cache-line within L1 cache 30 could be a nominating cache-line and cause the macro-block to be active with respect to different nominating cache-line. In the example of the preceding paragraph, both cache-lines CL-1 and Cl-2 would be nominating cache-lines to macro-block X. Accordingly, macro-block X would be in two entries within AMBT 40. The MBTAG could be changed to reflect the nominating cache-line. For example, the information in the cache-line no. column could be part of the MBTAG column.

The present invention improves latency. Latency is improved because cache-lines are fetched before they are needed. Also, cache-lines that would have been used are not evicted from L1 cache 30. There may be a significant improvement in bandwidth.

The invention can contribute to power savings by allowing an SFP, e.g., coupled with smaller cache lines, to predict which banks of cache need to be powered when performing a transaction. The invention can improve dynamic random access memory (DRAM) latency/bandwidth by having an SFP coupled with larger cache lines allow prefetching of all needed data from an open DRAM page while it is open, while minimizing the pollution resulting from fetching the whole page. This may reduce the number of transactions between pages, improving both bandwidth and latency of the DRAM sub-system.

With respect to compiler development, the SFP may allow code developers to garner performance benefits from well-written code that exhibits spatial locality without introducing a serious defect in applications that exhibit less spatial locality.

In the embodiments described above, the boundaries of the macro-block are selected before the macro-block is active. Accordingly, the nominating cache-line could be any of the cache-lines within the macro-block. Under alternative embodiments, the boundaries of the macro-block could be defined based on the nominating cache-line. For example, the macro-block could consist of the nominating cache-line and the cache-line before the nominating cache-line in main memory and two cache-lines after the nominating cache-line in main memory. As another example, the macro-block could consist of the nominating cache-line and the two cache-lines before and after the nominating cache-line in main memory.

Although the present invention may involve increasing the number of tags (e.g., those in AMBT 40 and SFT 42), there is an overall increase in performance.

The AMBT and SFT are not required to use a bit vector as illustrated in FIGS. 3 and 4 and in figures below, but may keep track of the cache-lines used through any mechanism, of which a pattern storage structure is merely an example. There could be a mechanism by which the memory access logic 34 consider priority in deciding which cache-line to prefetch first.

Figure 7:
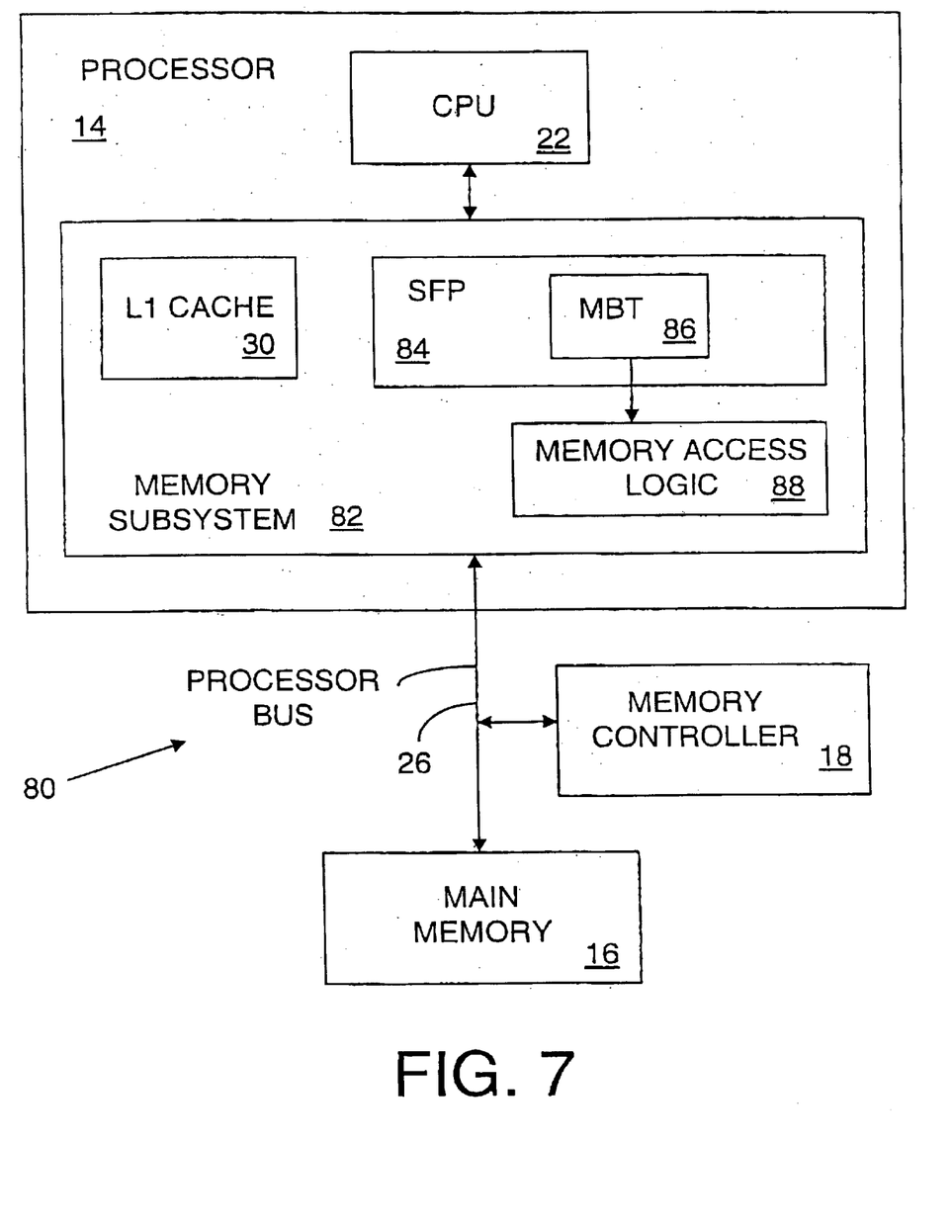
FIG. 7 is block diagram representation of a computer system that includes an alternative spatial footprint predictor as compared to the spatial footprint predictor of FIG. 1.
Figure 8:
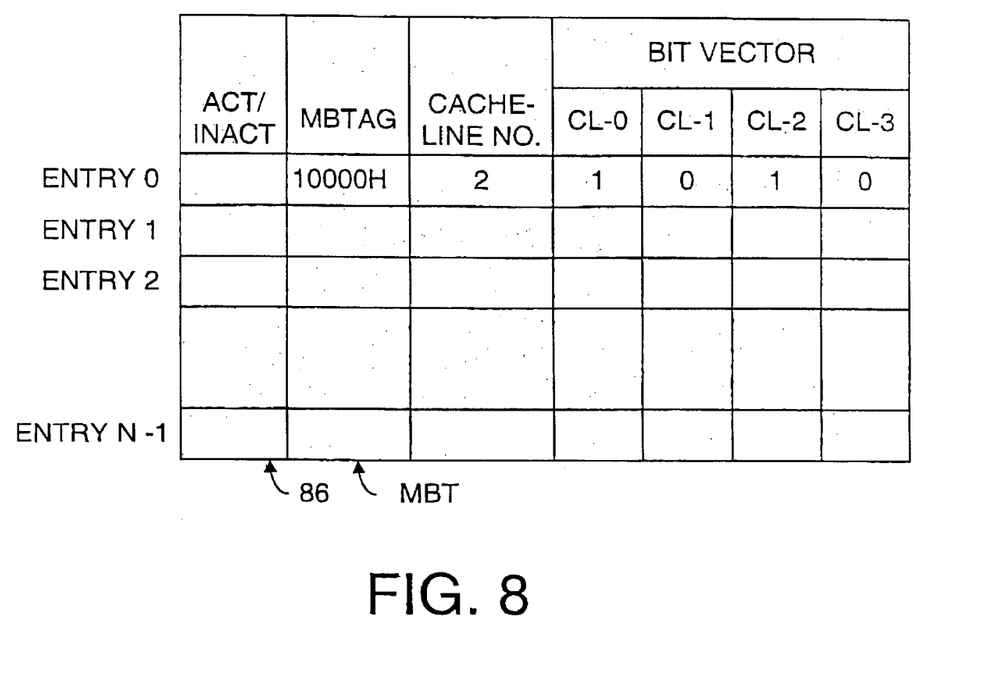
FIG. 8 is a graphical representation of certain details of one embodiment of the macro-block table (MBT) of FIG. 7.

Under some embodiments of the invention, the functions of the AMBT and SFT are combined in one table, a macro-block table (MBT). Referring to FIG. 7, a computer system 80 includes a memory subsystem 82 having a spatial footprint predictor 84 with an MBT 86. Memory access logic 88 may be the same as memory access logic 34. Otherwise, computer system 80 may be the same as computer system 10. Referring to FIG. 8, one embodiment of MBT 86 may be the same as AMBT 40 except for the addition of an Active/Inactive column. A bit of a first voltage (e.g., a logic high) in this column indicates the macro-block is active. A bit of a second voltage (e.g., a logic low) in this column indicates the macro-block is not active. When the bit is not used, the combined MBTAG and cache-line no. (considering any set associativity) can be used as a cache-line tag (as in the SFT). There may be a certain number of entries dedicated for active vs. inactive macro-blocks (e.g., ¼ active and ¾ inactive). Macro-blocks could switch from active to inactive in MBT 86 on the same basis that they switch from AMBT 40 to SFT 42 and become evicted from MBT 86 on the same basis as cache-lines are evicted from SFT 42.

The SFT may create a mapping between a spatial footprint and program state that is highly correlated. The spatial footprint of a cache-line may be closely associated with two program features: the sequence of instructions executed following the reference to the cache-line, and the address of the cache-line itself.

Figure 9:
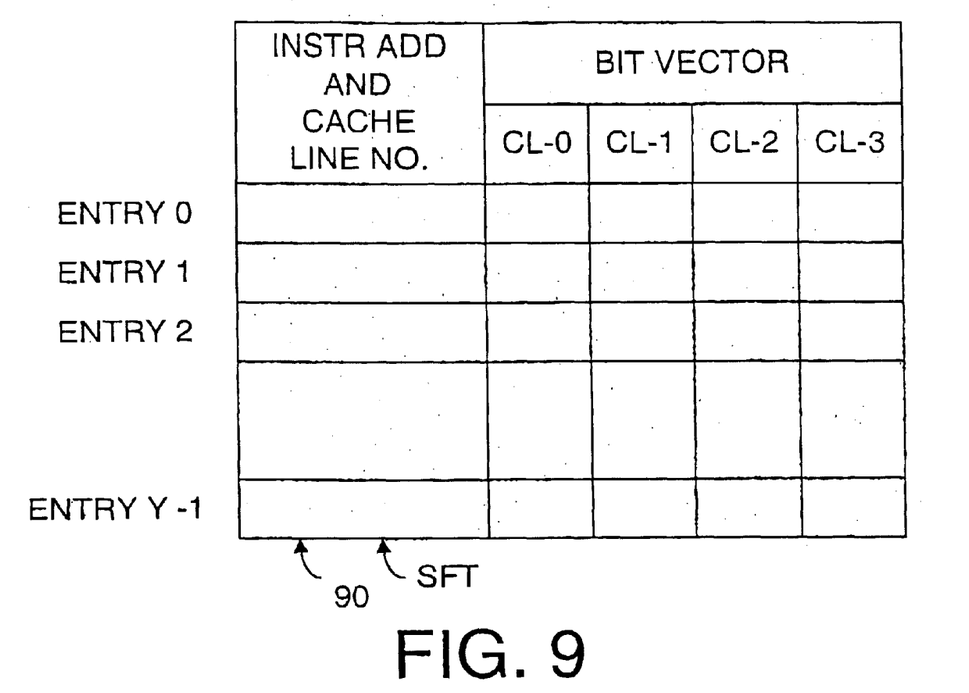
FIG. 9 is a graphical representation of certain details of an alternative embodiment of the SFT of FIG. 1.
Figure 10:
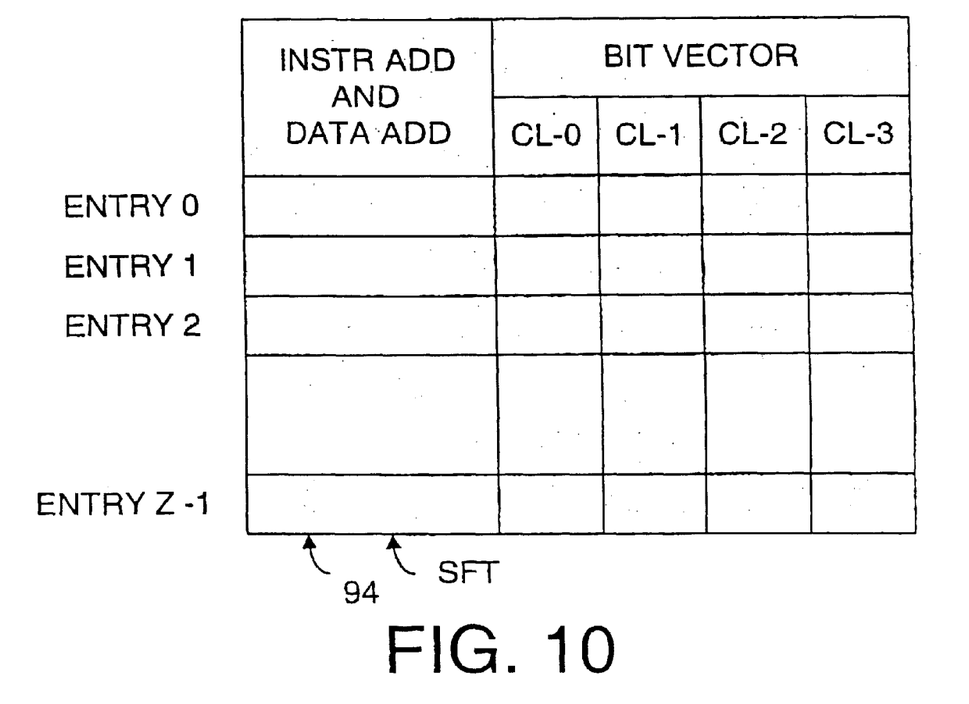
FIG. 10 is a graphical representation of certain details of another alternative embodiment of the SFT of FIG. 1.

Referring to FIG. 9, in some embodiments, an SFT 90 is indexed through all or part of an instruction address in combination with the cache-line no. (e.g., 0, 1, 2, or 3 in the case of a four cache-line macro-block). Referring to FIG. 10, in some embodiments, an SFT 94 is indexed through a function taking as inputs all or part of an instructions address and all or part of the data address. For example, the 8 most significant bits (MSB) of the instruction address and the 8 MSBs of the data address may be used as a tag to the spatial footprints. As examples, the function may be concatenation or XOR.

With respect to still other embodiments, an instruction can cause cache-lines to be accessed in different portions of macro-blocks (e.g., a macro-block with 16 cache-lines). A tag to the SFT could be a combination of bits of the instruction address plus a shifting of the tag to one of the macro-blocks.

Bits from different bit vectors of the same macro-block at different times can be logically ORed so that more cache-lines are accessed. This leads to fetching more desirable, but also undesirable, cache-lines.

The various embodiments may be used in connection with variable length cache-lines.

When the spatial footprint is the same as a default footprint, the spatial footprint can be discarded.

To avoid thrashing the SFT, the SFP can be used in combination with a coarse-grained locality predictor. Some of the mechanisms (e.g., AMBT) can be shared by the coarse-grained predictor.

The memory overhead of the SFP can be reduced by compressing the footprint while in the SFT.

The disclosure uses the phrase "in some embodiments" with respect to various structures or characteristics. The "in some embodiments" referred to in one part of the disclosure are not necessarily the same "in some embodiments" referred to in other parts of the disclosure.

Boundaries between the various columns in the AMBT, SFT, and MBT are conceptual, not necessarily actual. The various memory bits or control transistors within the AMBT, SFT, and MBT do not have contiguous within the die. The various components could share resources. For example, L1 cache 30 and AMBT 40 could share tags.

The specification does not illustrate or describe various well known components, features, and conductors, a discussion of which is not necessary to understand the invention and inclusion of which would tend to obscure the invention. Further, in constructing an embodiment of the invention, there would be various design tradeoffs and choices, which would vary from embodiment to embodiment. Indeed, there are a variety of ways of implementing the illustrated and unillustrated components.

The borders of the boxes in the figures are for illustrative purposes, not to restrict boundaries of the components which may overlap. The relative size of the illustrative components does not to suggest actual relative sizes. Arrows shown certain data flow in certain embodiments, but not every signal, such as requests for data flow. As used herein "logic" does not mean that software control cannot be involved. The term "conductor" is intended to be interpreted broadly and includes devices that conducts although they also have some insulating properties. There may be intermediate components or conductors between the illustrated components and conductors.

The term "connected" and "coupled" and related terms are used in an operational sense and are not necessarily limited to a direct connection or coupling. If the specification states a component or feature "may", "can", "could", or is "preferred" to be included or have a characteristic, that particular component or feature is not required to be included or have the characteristic. The term "responsive" includes completely or partially responsive.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A spatial footprint predictor, comprising:
a mechanism to measure spatial footprints of macro-blocks associated with nominating cache-lines and hold the spatial footprints, wherein particular ones of the spatial footprints are measured and held with respect to corresponding particular ones of the nominating cache-lines; and
memory access logic to determine which cache-lines to prefetch responsive to at least some of the spatial footprints.

2. The predictor of claim 1, wherein the mechanism includes:
an active macro-block table (AMBT) to measure the spatial footprints; and
a spatial footprint table (SFT) to hold the spatial footprints.

3. The predictor of claim 2, wherein the AMBT is indexed through a portion of addresses of cache-lines represented therein.

4. The predictor of claim 2, wherein the SFT is indexed through a cache-line tag.

5. The predictor of claim 2, wherein the SFT is indexed through at least a portion of the nominating cache-line address.

6. The predictor of claim 2, wherein the SFT is indexed through a function taking as inputs at least a portion of a corresponding instruction address and at least a portion of a corresponding data address.

7. The predictor of claim 1, wherein the mechanism includes a macro-block table (MBT) in which macro-blocks may be active or inactive.

8. The predictor of claim 1, wherein the macro-blocks including the corresponding nominating cache-lines becomes active when the corresponding nominating cache-lines are fetched.

9. The spatial footprint predictor of claim 1, wherein the cache-lines must be prefetched twice to be considered part of the spatial footprint.

10. A computer system, comprising:
a processor including:
a mechanism to measure spatial footprints of macro-blocks associated with nominating cache-lines and hold the footprints, wherein particular ones of the spatial footprints are measured with respect to corresponding particular ones of the nominating cache-lines; and
memory access logic to use the spatial footprints to determine which cache-lines to prefetch; and
main memory to hold the cache-lines.

11. The system of claim 10, wherein the mechanism to measure spatial footprints includes a spatial footprint table (SFT) and the SFT is indexed through a function taking as an input at least a portion of a corresponding instruction address.

12. The system of claim 10, wherein the mechanism to measure spatial footprints includes a spatial footprint table (SFT) and the SFT is indexed through a function taking as an input at least a portion of a corresponding data address.

13. The computer system of claim 10, wherein the mechanism includes:
an active macro-block table (AMBT) to measure the spatial footprints; and
a spatial footprint table (SFT) to hold the spatial footprints.

14. A spatial footprint predictor, comprising:
a mechanism to hold spatial footprints of macro-blocks associated with nominating cache-lines, wherein particular ones of the spatial footprints are measured with respect to corresponding particular ones of the nominating cache-lines;
a mechanism to use at least some of the spatial footprints to specify which cache-lines in macro-blocks to prefetch.

15. The predictor of claim 14, wherein the spatial footprints may specify that only one cache-line in the macro-block be prefetched.

16. The predictor of claim 14, further comprising an active macro-block table (AMBT) to measure the spatial footprints; and wherein the mechanism to hold the spatial footprints includes a spatial footprint table (SFT).

17. The predictor of claim 16, wherein the AMBT is indexed through a portion of addresses of cache-lines represented therein.

18. The predictor of claim 16, wherein the SFT is indexed through a cache-line tag.

19. The predictor of claim 16, wherein the SFT is indexed through at least a portion of the nominating cache-line address.

20. The predictor of claim 16, wherein the SFT is indexed through a function taking as inputs at least a portion of a corresponding instruction address.

21. The predictor of claim 14, wherein the mechanism to hold includes a macro-block table (MBT) in which macro-blocks may be active or inactive.

22. A spatial footprint predictor, comprising:
means for measuring spatial footprints of macro-blocks associated with nominating cache-lines and for holding the spatial footprints, wherein particular ones of the spatial footprints are measured and held with respect to corresponding particular ones of the nominating cache-lines and wherein the means includes an active macro-block table (AMBT) to measure the spatial footprints and a spatial footprint table (SFT) to hold the spatial footprints; and
memory access logic to determine which cache-lines to prefetch responsive to at least some of the spatial footprints.

23. A computer system, comprising:
a processor including:
a spatial footprint predictor comprising an active macro-block table (AMBT) to measure spatial footprints of macro-blocks associated with nominating cache-lines and a spatial footprint table (SFT) to hold the spatial footprints, wherein the spatial footprints may specify that only one cache-line in the macro-block be prefetched and the AMBT is indexed through a portion of addresses of cache-lines represented therein, wherein particular ones of the spatial footprints are measured with respect to corresponding particular ones of the nominating cache-lines;
memory access logic to use at least some of the spatial footprints to specify which cache-lines in macro-blocks to prefetch; and
a cache to hold the prefetched cache lines; and
main memory to hold the prefetched cache-lines as wells as non-prefetched cache-lines.

* * * * *